(12) United States Patent
Unchida et al.

(10) Patent No.: US 6,651,061 B2
(45) Date of Patent: Nov. 18, 2003

(54) ELECTRONIC FILE MANAGEMENT SYSTEM

(75) Inventors: Jiyunji Unchida, Minato-ku (JP); Yoshinobu Hara, Minato-ku (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 238 days.

(21) Appl. No.: 09/895,567

(22) Filed: Jun. 28, 2001

(65) Prior Publication Data

US 2002/0046253 A1 Apr. 18, 2002

(30) Foreign Application Priority Data

Jul. 4, 2000 (JP) .................................. 2000-201708
Jul. 11, 2000 (JP) .................................. 2000-209213

(51) Int. Cl.[7] .............................................. G06F 17/30
(52) U.S. Cl. ................................................. 707/9
(58) Field of Search ........................ 707/9, 10, 4, 103 Z, 707/203; 379/265.09; 705/201; 709/203, 223, 227, 225, 229

(56) References Cited

U.S. PATENT DOCUMENTS

| | | | | |
|---|---|---|---|---|
| 6,023,708 A | * | 2/2000 | Mendez et al. | 707/203 |
| 6,061,798 A | * | 5/2000 | Coley et al. | 713/201 |
| 6,275,942 B1 | | 8/2001 | Bernhard et al. | 713/201 |
| 6,381,644 B2 | * | 4/2002 | Munguia et al. | 709/225 |
| 6,463,418 B1 | * | 10/2002 | Todd | 705/26 |

FOREIGN PATENT DOCUMENTS

| | | |
|---|---|---|
| JP | 9027804 | 3/1996 |
| JP | 11219326 | 8/1999 |
| JP | 9252323 | 12/1999 |

* cited by examiner

Primary Examiner—Diane D. Mizrahi
Assistant Examiner—Apu M Mofiz
(74) Attorney, Agent, or Firm—Fenwick & West LLP

(57) ABSTRACT

A secured as well as convenient system for information exchanging between enterprises using the Internet. An external server is divided into public Web server and a Web data management server, which connect to each other via a firewall. Data sent from browsers of outside users to the Web server are transferred to the Web data management server via the firewall. Thus, the firewall in the external server protects data supplied by outside users.

12 Claims, 17 Drawing Sheets

FIG. 6

Data Writing Screen

Basic Information

Title /71

Part Name /73

Drawing (Part) No. /75

☐ — ☐ — ☐ — ☐

Single Part No. /76

☐ — ☐ — ☐ — ☐

Name of Responsible Person   Phone Number   E-mail Address /77

Noting Field /78

Attached File /79
[ Reference ]

Change (Replacement) or Withdrawal of Already Submitted Proposal

○ Change (Replacement) /81
○ Withdrawal
Data ID /82
Data Password /83

[ Send ] /84

FIG. 12

Layout of Historical Database

|  | (DATA-1) | (DATA-2) | (DATA-3) |
|---|---|---|---|
| ⟨Data Condition Area⟩ | | | |
| ・Data Condition | : NEW | : REPLACE(OLD) | : REPLACE(NEW) |
| ・Internal Sending Condition | : SENT | : SENT | : SENT |
| ⟨New Data Information Area⟩ | | | |
| ・Processing Date | : 2000/01/01 09:11:15 | : 2000/01/01 08:15:20 | : 2000/01/03 10:15:23 |
| ・Sending Date | : 2000/01/01 09:11:30 | : 2000/01/01 08:15:30 | : 2000/01/03 10:15:44 |
| ・Data ID | : HMXX0001 | : HMXX0002 | : HMXX0005 |
| ・DataPassword | : 1A2GW | : BV3AA | : QQ473 |
| ・USER-ID | : UR0001 | : UR0002 | : UR0002 |
| ⟨Replacement/Withdrawal Information Area⟩ | | | |
| ・Processing Date | | : 2000/01/03 10:15:20 | : 2000/01/03 10:15:24 |
| ・USER-ID | | : UR0002 | : UR0002 |
| ・Sending Date | | : 2000/01/03 10:15:22 | : 2000/01/03 10:15:26 |
| ・Data ID to be Replaced | | : | : HMXX0002 |
| ・Data ID for Replacement | | : HMXX0005 | : |

FIG. 13

(For Displaying All Data)

| (Mark) | (Data ID) | (Data Portion) | (Date of Creation) | (date of replacement withdrawal) | (Data for Replacement) | (Replaced Data) |
|---|---|---|---|---|---|---|
|  | HMXX0001 | DDDDDDDD | 2000/01/01 |  |  |  |
| — | HMXX0002 | DDDDDDDD | 2000/01/01 | 2000/01/03 |  |  |
| × | HMXX0003 | DDDDDDDD | 2000/01/01 | 2000/01/02 | HMXX0005 |  |
|  | HMXX0004 | DDDDDDDD | 2000/01/02 |  |  |  |
| + | HMXX0005 | DDDDDDDD | 2000/01/02 | 2000/01/03 |  | HMXX0002 |
|  | HMXX0006 | DDDDDDDD | 2000/01/03 |  |  |  |
|  | HMXX0007 | DDDDDDDD | 2000/01/03 |  |  |  |
|  | HMXX0008 | DDDDDDDD | 2000/01/04 |  |  |  |

ELECTRONIC FILE MANAGEMENT SYSTEM

FIELD OF THE INVENTION

The present invention relates to an electronic file management system used with the Internet and more particularly to a highly secured electronic file management system under which a plurality of users can supply data to a database server of an enterprise.

BACKGROUND OF THE INVENTION

With the spread of communication through the Internet, many enterprises supply their Web sites to users for interactive communication with them. Interactive type Web pages are created as dynamic HTML documents using CGI (Common Gateway Interface) program. User writable Web pages are called forms. A user who browses Web pages with Web browser can write data at predetermined portions of forms or attach a file thereto and then click a send button to send the written data or the attached file to the Web server.

When the above-mentioned interactive Internet communication is employed for businesses, there arises a problem of data security. Particularly in case that an enterprise is supplied with information on parts or other materials, proposals for designs or the like by a plurality of enterprises that are in cooperation with it or whishing to trade with it, most of the information is confidential and therefore a great trouble would be caused if a hacker or the like should read the information and distribute it. Further, under such a risky situation, users are reluctant to supply data to the enterprise and accordingly it cannot timely obtain useful data.

As technologies used for security in Internet communication, there are firewall technology and encryption technology. Japanese Patent Application Laying Open (KOKAI) No. 9-252323 describes a system in which a moving host is added to a system connecting a in-house network and the Internet via a firewall. Further, Japanese Patent Application Laying Open (KOKAI) No.9-27804 describes a data packet encryption with which data packets are sent from a source host to a destination host.

FIG. 2 shows a general configuration of a conventional system which runs a Web site of an enterprise. An in-house system 30 is provided with an internal server 33 connected to an in-house network such as an intranet, so that many in-house users can access a data management server through browsers 32. The system 30 connects to a public Web server 22 in an external server 21 and communicates with it via a firewall 35. Personal computers 1 to n of a plurality of users can access the public Web server 22 via the Internet to access the Web site of the enterprise.

For example, when a user activates a browser in a personal computer 1 to access a Web site on the public Web server, writes data in its forms, attaches a file and clicks a send button, the data and the attached file are sent to CGI program in the public Web server and processed by predetermined programs. The data and attached file thus processed are transferred through the firewall 35 to the internal server 33 within the enterprise and then stored in a storage device. In-house users can access the internal server 33 using in-house terminals or personal computers 32 to access the data supplied by outside users.

In the above case, from a standpoint of security for the internal system of the enterprise, the public Web server connected to the Internet is installed outside the enterprise, so that outside users cannot access the internal system.

Further, in the above case, information that users or a plurality of companies in cooperation with the enterprise, supply to who give orders or the enterprise, is confidential to the companies in cooperation with the enterprise. Accordingly, the system should be designed in such a way that the confidentiality of information should be ensured and the consistency should be maintained between information stored in an internal server in the enterprise and that stored in a database of a Web server.

Japanese Patent Application Laying Open (KOKAI) No. 11-219326 describes a file management system for sending and receiving electronic files using an intranet protected with a firewall and the Internet which can communicate with the intranet, wherein a master electronic file manager is placed on the Internet and a slave electronic file manager is placed on the intranet and when a user access the slave electronic file manager, it starts to send and receive electronic files and information for managing classification thereof.

However, the above conventional technique specifically relates to management of e-mail and is not directed to information exchanging between enterprises using HTTP protocol of the Internet.

SUMMARY OF THE INVENTION

In the above mentioned conventional system, there is a danger that the data which outside users have supplied to the system might be accessed in an unauthorized manner while they are stored in the storage device in the public Web server. Further, the outside users cannot pass through the firewall 35 and therefore they find it inconvenient that they are unable to correct the data that they have once supplied to the system. Accordingly, there exists the need for an electronic file management system with which sufficient security is ensured. Further, there exists the need for an electronic file management system which gives outside users flexibility of being able to correct data.

In order to solve the above-mentioned problem, an electronic file management system according to the present invention is that comprising an external server installed in the outside and an internal server communicating with the external server wherein the external server comprises a public Web server which a browser can access via the Internet and a Web data management server which is connected to the public Web server via a firewall and the public Web server contains a Web site of an enterprise associated with the internal server, so that data which a browser accessing the Web site interactively sends to the public Web server, are sent to the Web data management server via the firewall.

According to the above invention, the external server is divided into the public Web server and the Web data management server, which connect to each other via the firewall. Data sent from a browser to the Web server are transferred to the Web data management server via the firewall. Thus, the firewall in the external server protects data supplied by outside users.

According to another aspect of the invention, the external server is connected to the internal server via a second firewall, so that the data stored in the Web data management server are sent to the internal server via the second firewall.

According to the above invention, higher security is established because data supplied from outside users are transferred to the internal server via the second firewall and an access from the outside to the internal server is subjected to the double firewalls.

According to another aspect, after having transferred the data received from the browser, to the Web data management server, the public Web server of the present invention is adapted to delete the data stored in the public Web server. Further, according to another aspect, after having transferred the data received from the browser, to the internal server, the Web data management server is adapted to delete the data stored in the Web data management server.

According to the above invention, data supplied by users, in the external server are deleted within a relatively short time and therefore a possibility that the data might be subjected to an unauthorized access from the outside, is reduced.

Further, according to another aspect of the invention, the public Web server is provided with a Web site of an enterprise, which includes a special-purpose page which users having a user ID and a user password issued by the enterprise, alone can browse, and data supplied by the users are sent to the public Web server using the special-purpose page. In addition, icons concerning businesses, already set to respective users, are displayed in the special-purpose page.

According to the above invention, outside users who supply data can be previously limited and therefore cases where too much useless information has to be handled, can be reduced.

According to another aspect of the invention, if the external server receives data normally, the external server issues a data ID unique to the file of the data, stores the data ID in a historical database. When a request to withdraw or replace the data specified by the data ID is sent from the browser to the external server, the external server compares the data ID with that in the historical database and when both of them agree with each other, the external server withdraws or replaces the file.

According to another aspect of the invention, on issuing the data ID, the external server issues a data password associated with the data ID and stores the data password in the historical database, in association with the data ID. In this case, withdrawal or replacement of a file, requested by the user, is executed when a data ID and a data password sent from the user agree with those stored in the historical database.

According to the above embodiment, outside users are given flexibility of being able to withdraw or replace the data that they previously supplied and therefore they can keep the data in the best state.

According to another aspect of the invention, at first the in-house data management server temporally stores the data from the external server in a receiving database, and then transfers the data to a data storing database after a certain time has lapsed or after a certain amount of data have been stored in the receiving database.

By virtue of the above aspect, number of changes or indexing of the data storing database that in-house users access, can be reduced, so that cases where the data storing database cannot be accessed or some of its functions are limited, can be reduced.

Further, there exists the need for a secured as well as convenient system for information exchanging between enterprises using the Internet.

A system according to the present invention is an electronic file management system provided with an internal server communicating via a firewall with an external server installed in the outside, the electronic file management system comprising a public Web server placed in the external server and connected to the Internet, a shared database placed in the external server, which users can access by way of the Internet through authentication and an internal database placed in the internal server, which corresponds to the shared database, wherein the shared database and the internal database are configured to match each other, based on information on changes in the internal database.

Since the external server that users access and the internal server are connected via the firewall, security of the internal server is maintained and consistency is kept between the shared database placed in the external server and the internal database related to the internal server. Accordingly, users can easily access the shared database, contents of which are the same with those of the internal database.

According to an aspect of the present invention, the external server and the internal server are connected by a private line and accesses of the users to the shared database are limited by authentication using a user ID and a user password. Accordingly, the internal server is more highly secured.

DESCRIPTION OF THE DRAWINGS

FIG. 6 is a drawing showing a data writing screen of one embodiment of the present invention.

FIG. 12 is a diagram showing an example of layout of a historical database in one embodiment of the present invention.

FIG. 13 is a diagram showing an example of display of all data in a historical databases in one embodiment of the present invention.

DETAILED DESCRIPTION OF THE INVENTION

Overall Configuration

Figure 1:
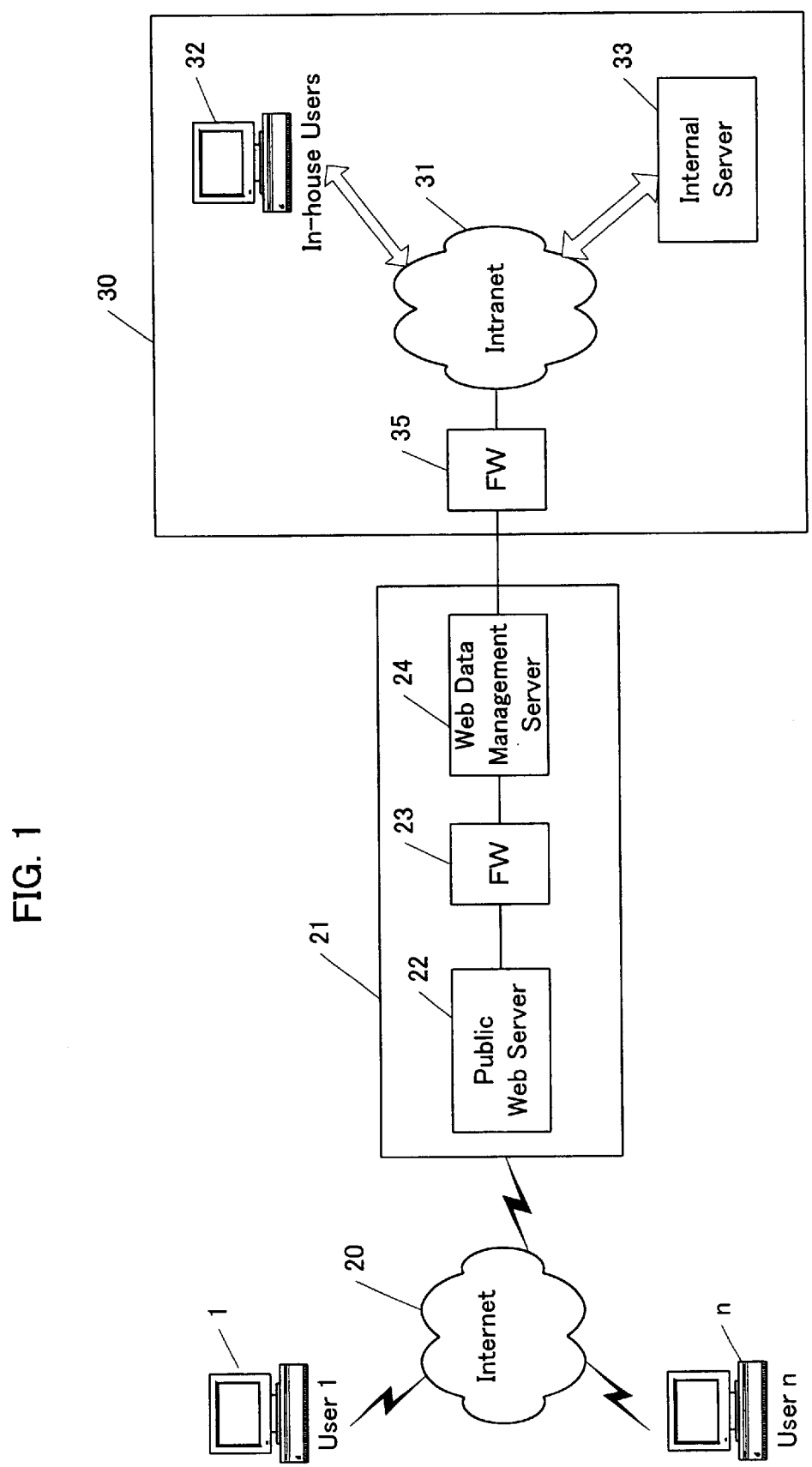
FIG. 1 is a block diagram showing an overall configuration of one embodiment of a system according to the present invention.
Figure 2:
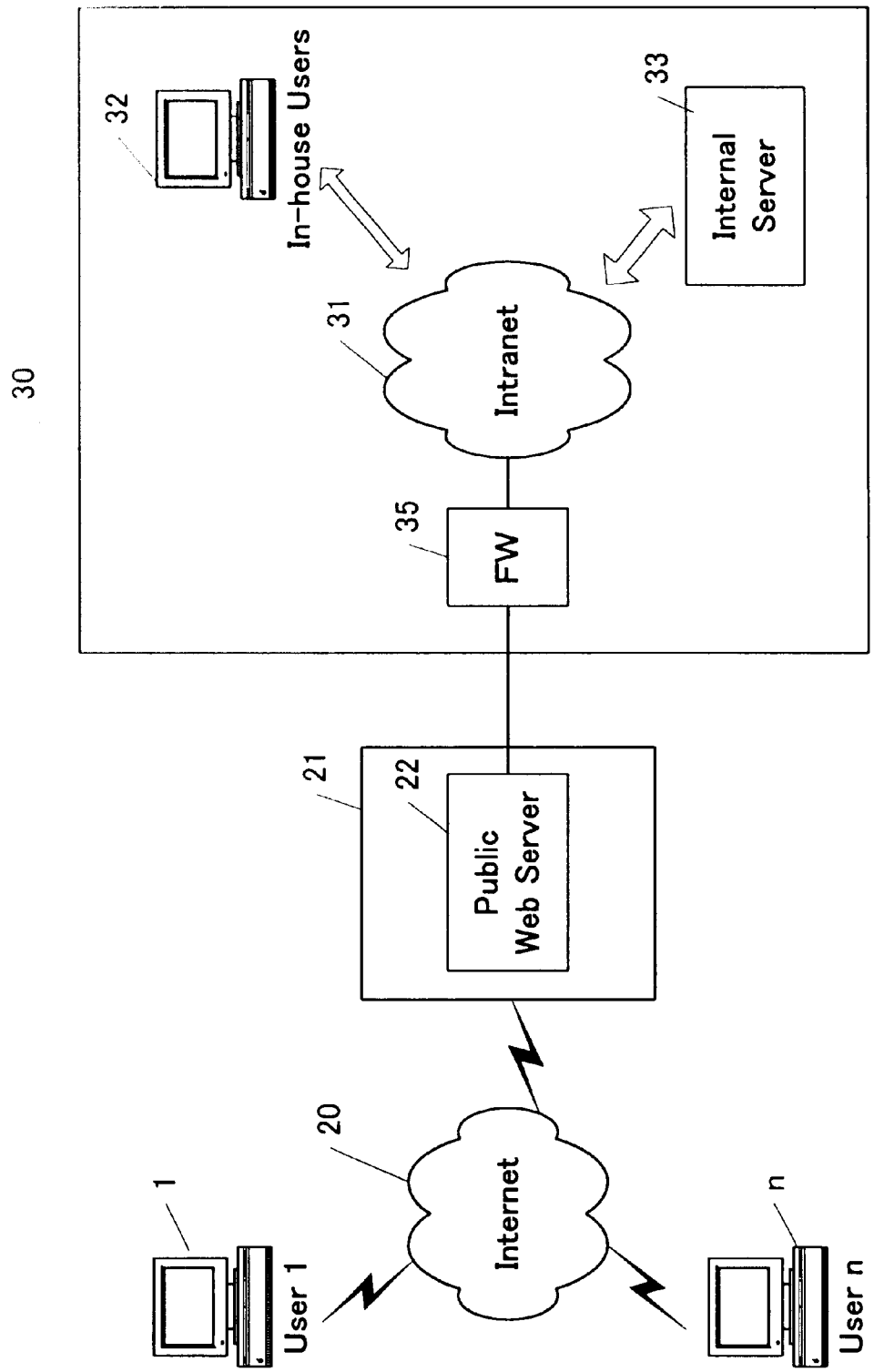
FIG. 2 is a block diagram showing an overall configuration of a conventional system.

Embodiments of the present invention are described below with reference to the drawings. FIG. 1 is a block diagram showing an overall configuration of an electronic file management system according to one embodiment of the present invention. An in-house system 30 is an in-house network system of an enterprise X. In this example, a plurality of personal computers 32 are connected to an intranet 31 comprising an in-house LAN, so that each of the personal computers 32 can access an internal server 33.

The in-house system 30 connects to an external server 21 via a firewall 35. The firewall is a router capable of selecting packets and selects packets using information included in a packet header, such as a source host address, a destination host address and a type of protocols. In this example, the intranet 31 connects to the external server 21 by a private line via the firewall, and the firewall 35 is adjusted to allow proper transmissions to pass through and to reject other incoming transmissions.

Figure 4:
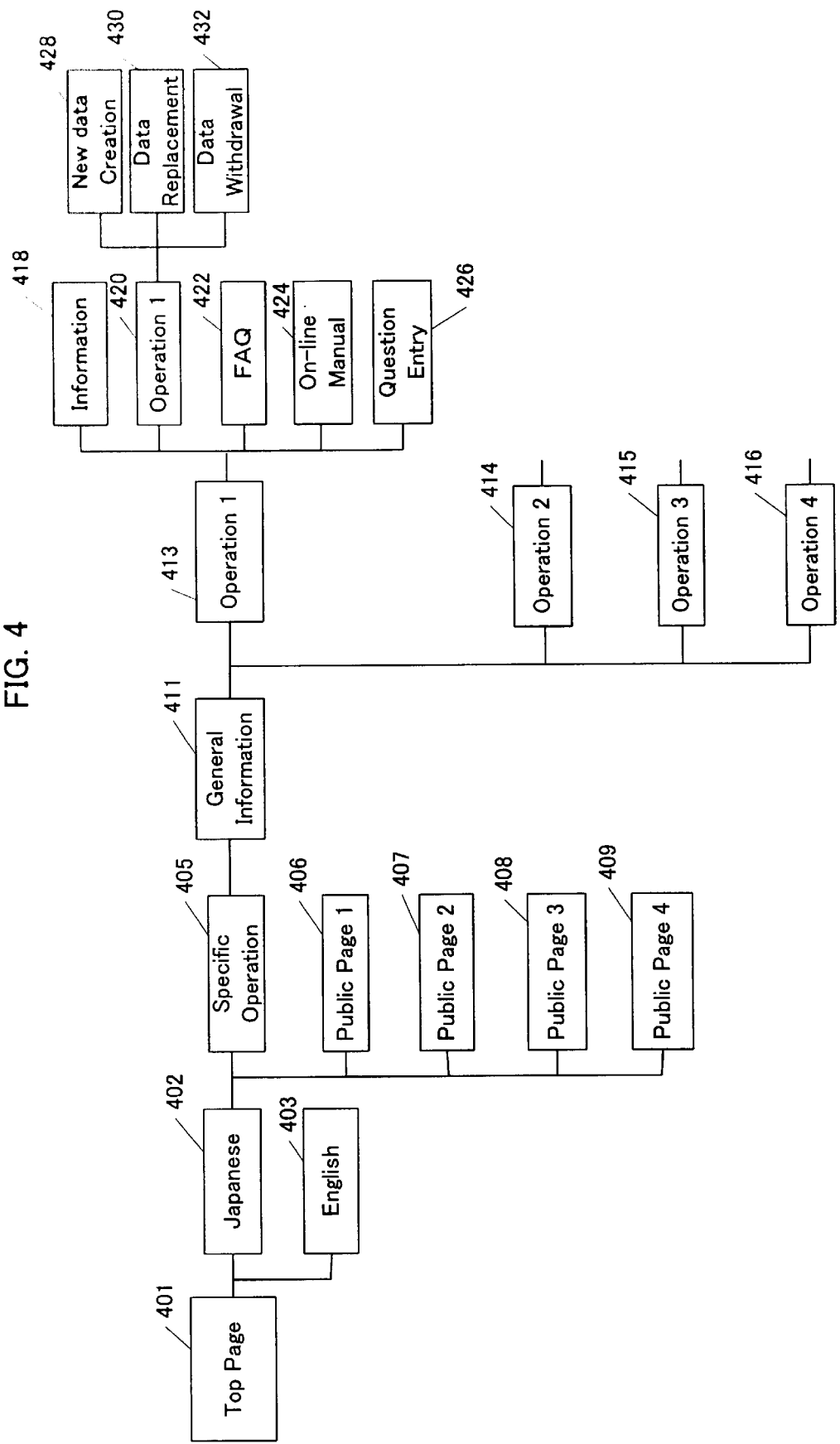
FIG. 4 is a drawing showing an overall configuration of a Web site of one embodiment of the present invention.

The external server 21 is run by a computer company and provided with a public Web server 22, a firewall 23 and a Web data management server 24. The public Web server 22 supplies many users 1 to n with a Web site of X via the Internet, under a commission from X. Users 1 to n mean users with personal computers 1 to n. In this example, the Web site of X is configured as shown in FIG. 4. When a user inputs URL of this site into the browser to send, the public Web server 22 returns the top page 401 of the site back to the user.

The top page can be switched between Japanese page 402 and English page 403 and Japanese page appears by default. A user can select to come, from the top page, into a specific operation page 405 for business, a public page 1 (406) for four-wheel vehicles, a public page 2 (407) for two-wheel vehicles, a public page 3 (408) for four-wheel vehicle drive information or a public page 4 (409) for two-wheel vehicle drive information.

The public pages 406, 407, 408 and 409 allow anyone to come into, while the specific operation page 405 is adjusted to allow those alone who have an ID (identification code) issued by X and a Registered password, to access. When a user inputs the user ID and password and clicks a send button to come into the specific operation page, the communication protocol is switched to HTTPS protocol using SSL (Secure Sockets Layer) encryption technology to continue the communication. At the public Web server 22, the user ID and password are subjected to authentication. If the authentication is successfully completed, a HTML document of a general information page 411 for business is sent to the user browser to be displayed on the screen. Since transmission and authentication of a user ID and a password is a technique widely used concerning the Internet, further explanation thereon is omitted.

Figure 5:
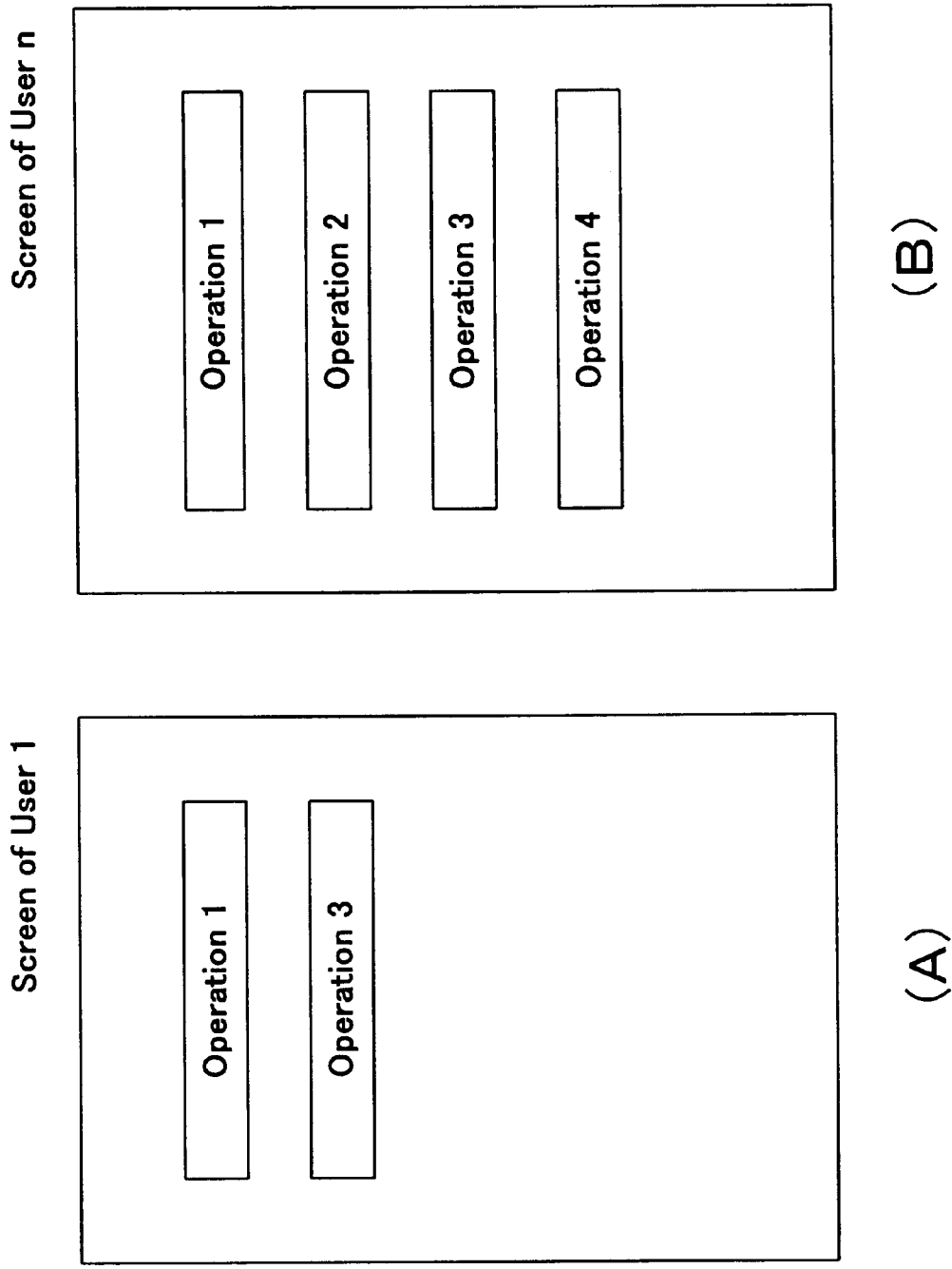
FIG. 5 is a drawing showing a menu page for business of one embodiment of the present invention.

In order to create the general information page 411 for business, items necessary for each user are selected with a dynamic menu method. For example, as shown in FIG. 5, a menu page (A) is displayed for a part supplying company A. The page includes a tab "operation 1" for coming into estimating operation and a tab "operation 3" for coming into delivery scheduling operation. On the other hand, a menu page (B) is displayed for a company B which takes part in the project from a stage of developing the product. The page includes a tab "operation 1" for coming into estimating operation, a tab "operation 2" for coming into improvement (Kaizen) suggesting operation, a tab "operation 3" for coming into delivery scheduling operation, a tab "operation 4" for coming into achievement and technical information supplying operation.

A user can select one from the pages of information 418, operation 1 (420), FAQ 422, on-line manual 424 and question entry 426. Through the page of operation 1 (420), the user can create and send new data (428), replace the data already sent to the Web server 22 (430) or withdraw the data already sent (432). When the user selects one of the pages operation 2, operation 3 and operation 4, he or she can come into pages which are different in content from, but similar in structure to those in case of operation 1.

The Web site of X is created using CGI (Common Gateway Interface) program located in "cgi-bin" directory at the public Web server 22. Pages for business are made of form type HTLM documents which allow inputs from browsers. Inputs from browsers are sent to the CGI program of the public Web server 22 as MIME (Multipurpose Internet Mail Extensions) data following a request directed to the CGI program, using POST command. For example, when a user writes data in a form "supplierbook.p1" and attaches a file as a file to be attached and clicks a "send" tag, the data and attached file are sent to the CGI program of the public Web server 22, as MIME main body following the header led by the following command.

POST/cgi-bin/supplierbook.p1 HTTP/1.0

An external server 21 transfers the data sent from users to a Web data management server 24. The Web data management server retains data sent from the public Web server 22 and sends them to the internal server 33 of X, at predetermined intervals, for example, every ten minutes.

External Server

Figure 3:
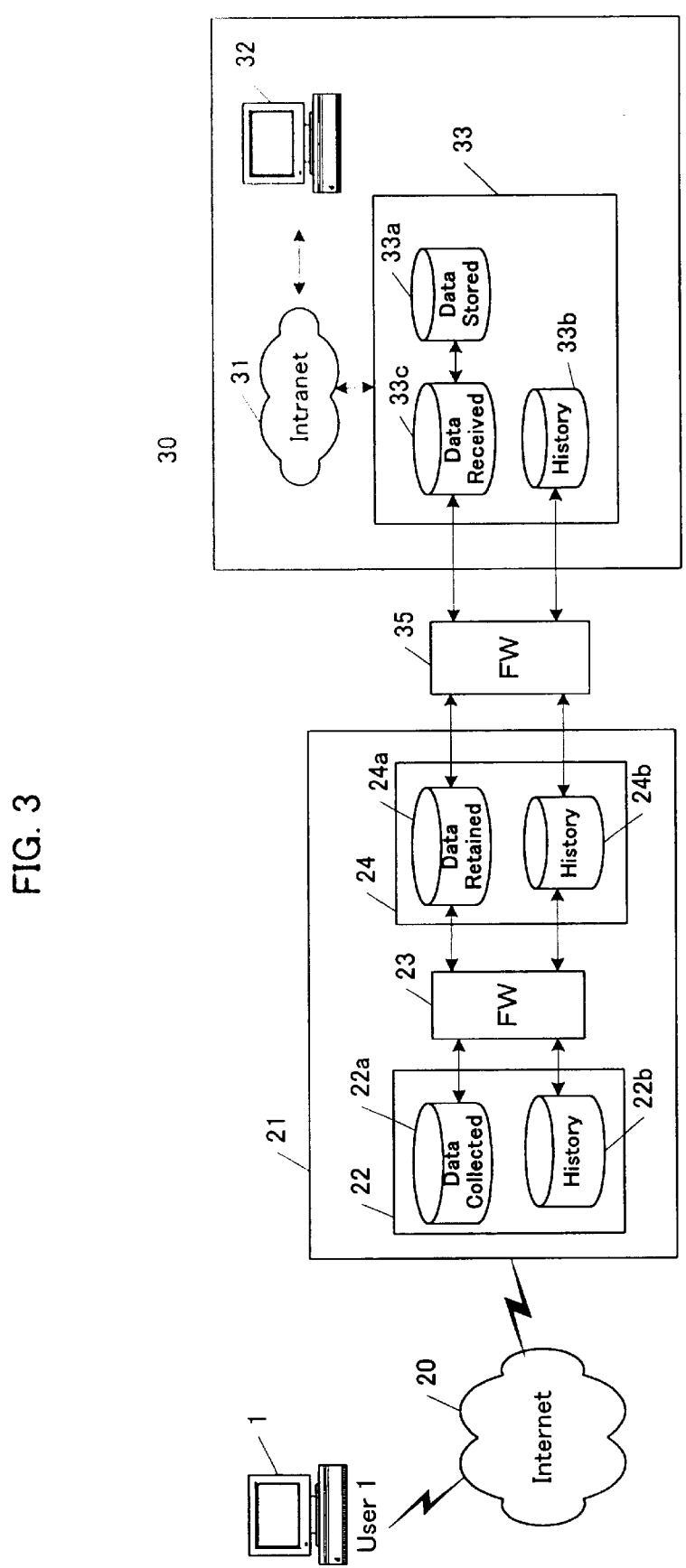
FIG. 3 is a more detailed block diagram of one embodiment of a system according to the present invention.

FIG. 3 is a block diagram showing in more detail a configuration of the external server 21 and in-house system 30. The public Web server 22 is provided with a data collecting database 22a and a historical database 22b. The databases 22a and 22b are stored typically in a magnetic disk storage device and may be stored in a physically integrated hard disc device. A database 22a is used to store users' data for a short time, and therefore it can be implemented using a partial area of a random access memory (RAM).

As mentioned above, on receiving data from users, the public Web server 22 sores the received data in the data collecting database 22a, as Notes documents, checks them for data consistency and format consistency and when an error is found, sends an error message containing information indicating a location of the error and a kind of the error, to the user. When an error is not found in the data, the CGI program issues a data ID (for example file number) unique to the data and a password corresponding to the data ID and stores the data ID and password in the historical database 22b together with information such as a name of the user who has sent the data, date and time of receiving the data and a size of the data.

In one embodiment, the public Web server 22 returns, to the user, the data ID and password thus issued, in the form of HTML document by the SSL encrypted communication mentioned above. Further, in another embodiment, after an access to the Web site of X made by the user is finished, the data ID and data password are sent not in the form of HTML document but in the form of e-mail.

Immediately after the data ID and password are issued, a management program of the public Web server 22 transfers the data collected in the data collecting database 22a in the form of Notes documents, via a firewall 23, to a data retaining database 24a in a Web data management server 24 by sending of mail, using TCP/IP protocol and clears (deletes) the data from the data collecting database 22a.

Historical data concerning the data received from the user are recorded in the historical database 22b and the contents are periodically duplicated in a historical database 24b in the data management server 24, by function of a periodic agent of the Notes program.

The data retaining database 24a and historical database 24b are stored typically in a magnetic disk storage device and may be stored in a physically integrated hard disc device. In one embodiment, a management program of the external server 21 sends the data retained in the data retaining database 24a and the historical data stored in the historical database 24b, to the internal server 33 of the in-house system, at predetermined intervals, for example every ten minutes. In another embodiment, when an amount of data retained in the data retaining database 24a exceeds a predetermined value, data transfer to the internal server 33 is executed and in case that an amount of data retained in the data retaining database 24a does not reach the predetermined value after a lapse of a predetermined time, for example an hour, the data transfer is executed after a lapse of an hour.

Internal Server

The external server 21 is connected to the in-house system 30 by a private line and data transferred from the external server 21 is received via a firewall 35 by a data receiving database 33c and a historical database 33b of the internal server 33. In one embodiment, data transfer from the external server 21 to the internal server 33 is executed by adding contents of the data retaining database 24a to the data receiving database 33c, by function of the periodic agent of the Notes program. A management program of the external server clears (deletes) the data in the data retaining database 24a after the data transfer to the internal server 33 is finished. As mentioned above, data sent from users are received by the internal server 33 and protected from unauthorized access from the outside, by existence of the two-stage firewalls and private line.

In one embodiment, data stored in the data receiving database 33c are added to a data storing database 33a using function of the periodic agent of the Notes program at predetermined intervals, for example every thirty minutes. After the data transfer is completed, the data stored in the receiving database 33c are cleared (deleted).

In-house users of X can access the data storing database 33a using terminal devices or personal computers 32. A period of transfer from the data receiving database 33c to the data storing database 33a is set, balancing availability when many users access the internal server 33 and urgency of the latest data. A longer period of transfer will relax restrictions on access due to updating and indexing of the databases in the internal server and on the other hand will increase a time which is required of in-house users until they can access the latest data. Accordingly, a period of transfer is set, balancing the needs mentioned above.

Business Menu Display

Figure 7:
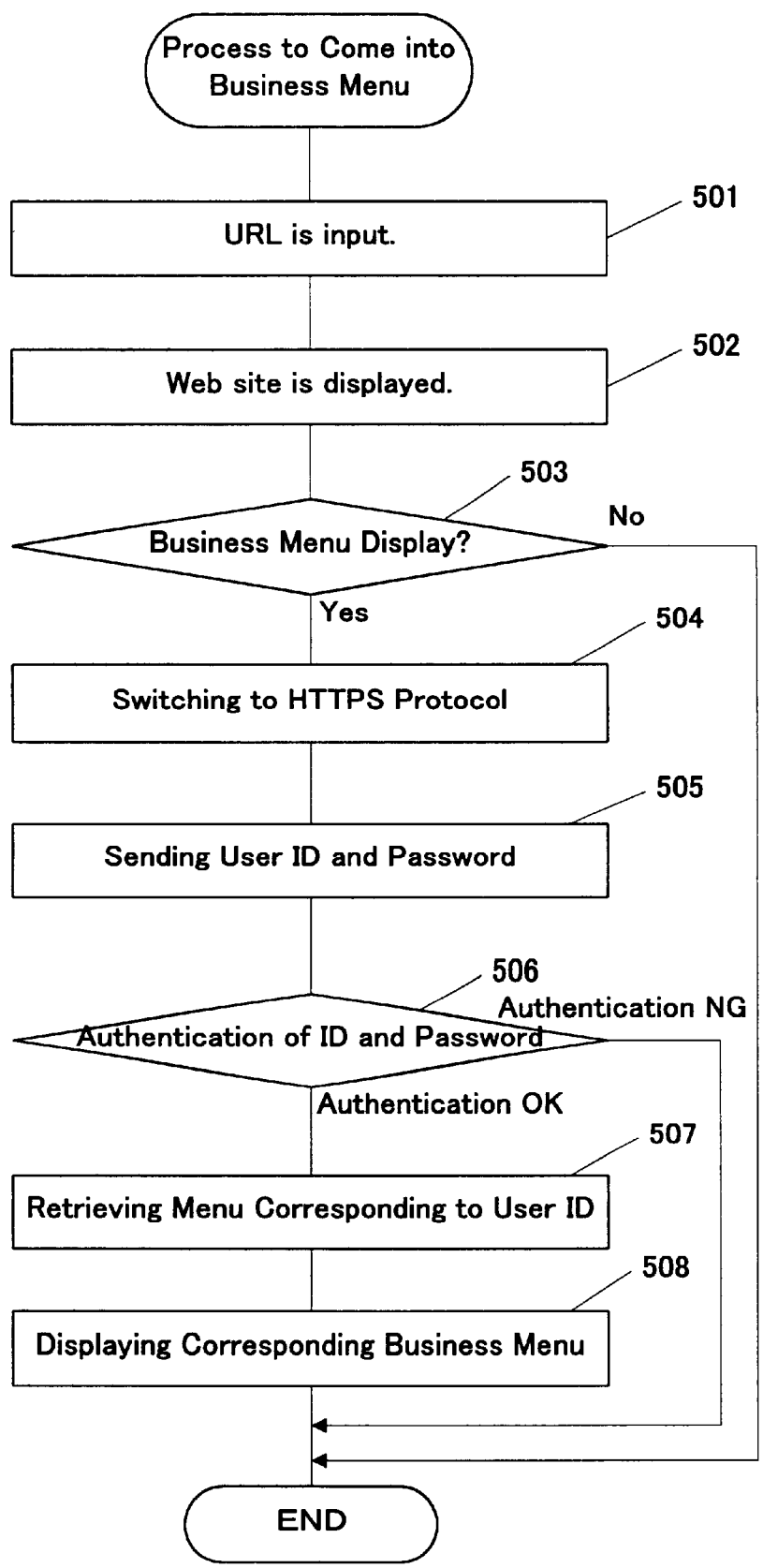
FIG. 7 is a flow chart showing a process in which a business menu is displayed in the browser in one embodiment of the present invention.

Flow of the processes of one embodiment of the present invention will next be described with reference to the flow charts of FIGS. 7 to 11. FIG. 7 shows a flow of the process from accessing to the Web site to displaying of the business menu. When a member of an associate company of X activates the browser on a personal computer 1 which is designed to have a dial-up connection with the Internet provider, inputs URL of X and presses an enter key (501), the public Web browser 22 corresponding to the URL sends the HTTP document for the top page of the Web site of X to the browser of the personal computer 1. The browser of personal computer n is hereinafter referred to as browser n.

Thus, the top page of the Web site of X is displayed on the browser 1. The top page includes a "business menu button" hyperlinked to a "business menu" page besides buttons hyperlinked to pages for company information, products information, distributors information or the like. Below the business menu button, fields are provided to input a user ID and a password.

When the user inputs the user ID and password and then clicks the "business menu button", the communication protocol is switched to HTTPS protocol carrying out encrypted communication using SSL (504) and the user ID and password are sent to the public Web server 22 (505). The public Web server 22 compares the user ID and password with those previously registered for authentication (506), and if the authentication is successful, selects a menu according to the user and edits a menu page (507) and sends the menu page in the form of HTML document to the browser 1. Thus, a business menu page corresponding to the user is displayed on the browser 1 (508).

Figure 8:
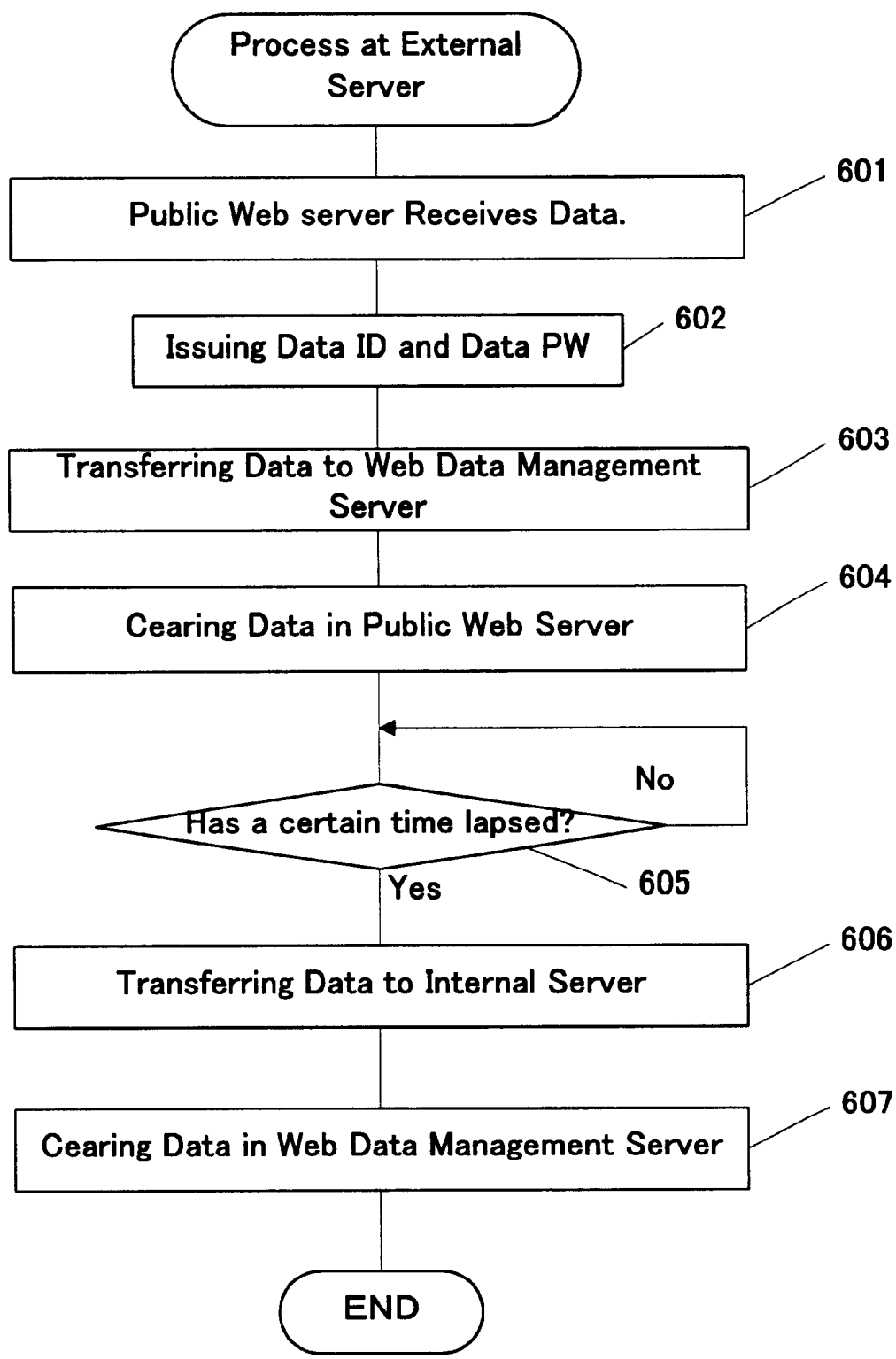
FIG. 8 is a flow chart showing a process in an external server in one embodiment of the present invention.

FIG. 8 is a flow chart showing a process of data handling at the external server 21. The user can make the personal computer 1 display a page for a specific operation, for example, a page for improvement (Kaizen) suggesting operation 2, through the business menu page. The page for improvement (Kaizen) suggestion is configured, for example, as shown in FIG. 6 and provided with a noting field 78 in which users can write any information and a file attaching field 79 to which a file can be attached. The file attaching field 79 has a pull-down menu of "reference". Clicking the reference button makes the personal computer 1 display its directory to select a file to be attached.

A screen for writing data shown in FIG. 6 includes a title field 71, a part name field 73, drawing (part) number field 75, a single part number field 76, fields 77 to input a name of a responsible person, phone number, e-mail address. Further, the screen is provided with selecting buttons 81 to change or withdraw already submitted proposals and fields 82, 83 to input a data ID and a data password which are to be described below.

Data Transfer

Referring to FIG. 8, when the user fills the noting field 78 and attaches a file containing a detailed proposal to the file attaching field 79 and presses a send button 84, the written data and attached file are sent from the browser 1 to the public Web server (601). In order to achieve the above function, the browser of personal computer 1 sends a request to the CGI program of the public Web server 22 using the above-mentioned POST command and sends information in the MIME form.

The Web server 22 stores the information from the user in the data collecting database 22a, in the form of Notes documents, checks the data format for an error, and if there exits no error, sends a data ID unique to the data and a password corresponding to the data ID, to the user and stores the data ID and password in the historical database 22b (602).

Then the management program of the external server 21 transfers the file stored in the data collecting database 22a and the data newly added to the historical database 22b via the firewall 23 respectively to the data retaining database 24a and the historical database 24b in the Web data management server 24 (603). Concurrently with the transfer, the files stored in the data collecting database 22a of the public Web server are cleared (604). Thus, data sent from users are protected by the firewall 23 from an access from the outside.

After a lapse of a predetermined time, for example, twenty minutes after the data retaining database 24a starts to retain a file, the management program of the external server 21 transfers the file retained in the data retaining database 24a and the historical data concerning the file, stored in the historical database 24b, via the firewall 35 to the internal server 33 of the in-house system 30, using the private line (606). On completion of the transfer, the management program of the external server 21 clears the file of the data which were sent from the user and then were retained in the data retaining database 24a.

The internal server 33 stores data files received from the external server in the data receiving database 33c and the stored files are transferred to the data storing database 33a at certain intervals, for example, every thirty minutes, while historical data of the files are stored in the historical database 33b. Concurrently with the transfer, the files stored in the data receiving database 33c are cleared. In another embodiment, whenever a capacity of files stored in the data receiving database 33c reaches a certain threshold, for example, one mega bytes, data transfer from the data receiving database 33c to the data storing database 33a, is executed. Further in another embodiment, in case that a capacity of the files does not reach the above threshold after an hour after a file transfer, another file transfer from the data receiving database 33c to the data storing database 33a, is executed.

New Data Registration Process

Figure 9:
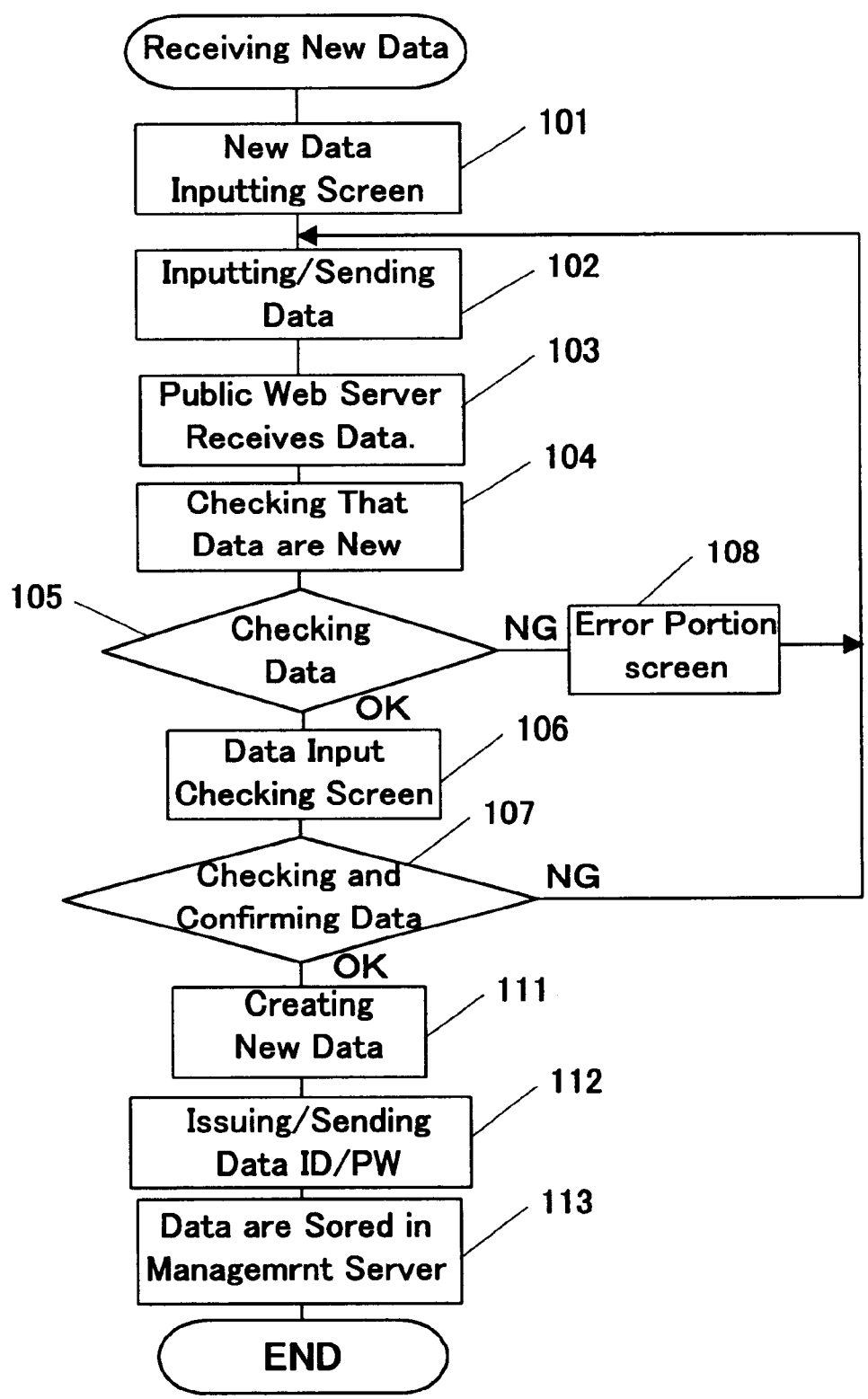
FIG. 9 is a flow chart showing a process of receiving new data in one embodiment of the present invention.

FIG. 9 shows a process in which new data are stored in the data management server 24. When a user has the data writing screen displayed in the browser in the personal computer 1 (101), inputs data or attaches a file to be attached and then clicks a send button (102), the data are sent to and received by the public Web server 22 and stored as Notes documents in the data collecting database 22a (103).

The public Web server 22 checks that the received data are new ones (104) when a flag indicating change or withdrawal is not attached to the received data, checks the data for a formal error (105) and if an error is found, sends HTML document pointing out the error, to the user (108), asking the user to correct the error. For example, if a name of a responsible person is not filled, the data are regarded as including an error.

When the data does not contain any formal error, HTML document of a screen to ask the user to check whether the received data should be received as they are, are sent to the user (106). When the user check the data and then clicks a confirm button on the checking screen, information of the clicking is sent to the public Web server 22. In response to the sending, the public Web server 22 receives the received data as new ones (111), issues a data ID unique to the received data and a data password and sends them to the user in the form of receiving receipt (112). The receiving receipt is in such a form as below.

Thank you very much for sending a "XXXXXX".
Your proposal was received by Honda at hh:mm:ss dd/mm/yy.
Personal ID number is "yyyyy".
Password is "zzzzz".

In the above, XXXXXX represents a title of the sent data, yyyyy represents a data ID and zzzzz represents a password. hh:mm:ss represent time, minute and second, respectively, while dd/mm/yy represent date, month and year, respectively.

The data ID, data password and date and time information are put in the historical database 22b. The data thus received and historical data are transferred to the management server 24 (113). On completion of the transfer, the public Web server 22 deletes the received data in the data collecting database 22a. In one embodiment, the contents of the historical database 22b are duplicated in the historical database 24b in the data management server 24. Transmission is carried out from the public Web server 22 to the data management server 24 via the firewall 23.

Referring to FIG. 12, a layout of historical data in the historical database 22b is shown. An example of a history of data newly received is shown in column DATA-1. In other words, NEW in a data condition field indicates that the data are new, while SENT in an internal sending condition field indicates that the data were sent to the data management server. Further, date and time when the new data were received are recorded in a processing date field in a <new data information area>, while date and time when sending was carried out to the data management server 24 are recorded in a sending date field in the <new data information area>. The data ID and the password are recorded in a data ID field and a data password field, respectively. The user ID of the user who supplied the data is recorded in a USER-ID field.

Data Withdrawal Process

Figure 10:
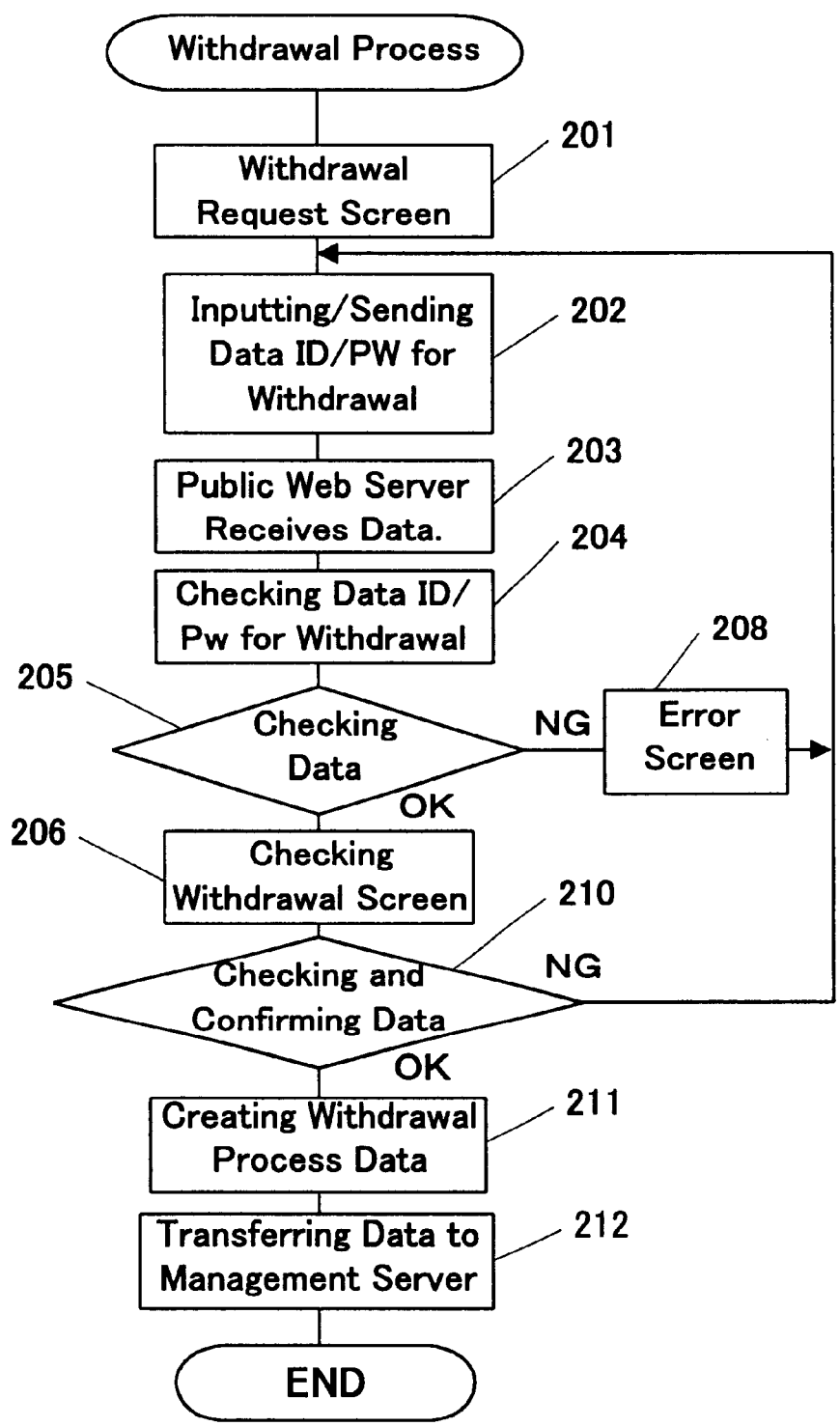
FIG. 10 is a flow chart showing a process of withdrawing data in one embodiment of the present invention.

Next, with reference to FIG. 10, a process in which the user withdraws data already supplied to X, will be described. The user comes into a page of a withdrawal request screen by processes described in relation to FIG. 4 from the browser of the personal computer 1 (202). In one embodiment, the data writing screen of FIG. 6 also functions as the withdrawal request screen. The user can select withdrawing operation by clicking "withdrawal" at a portion 81 for selection between change and withdrawal, in the screen. Then, a black dot appears in the center of a circle at the left of the characters "withdrawal".

Following the above process, the user inputs the data ID and the data password of the data that should be withdrawn, in a data ID field 82 and a data password field 83 and clicks a send button 84 (202). The public Web server 22 receives the data (203), checks whether the received data ID and data password agree with those recorded in the historical database (204) and checks the data for a formal error (205). When the data ID or data password does not agree with that recorded or a formal error is found, an error screen is sent to the user in the form of HTLM document to ask the user to input correct ones (208).

When an error is not found in the received data, the Web server 22 sends to the user a screen for checking withdrawal to ask the user to finally check whether the data of the data ID should be withdrawn. The screen for checking may be that provided with items shown in FIG. 6 and further with a "withdrawal confirm" button. When the user clicks a withdrawal confirm button (210), the public Web server 22 creates withdrawal process data (211).

To be more specific, with reference to FIG. 13, provided that data having data ID of HMX0003 has been withdrawn by the user, the Web server 22 records a withdrawal mark in a "mark" field of a record with data ID of HMX0003. Since data are not stored in the data collecting database 22a in the public Web server 22 as mentioned above, the data collecting database 22a does not need a deleting process.

The withdrawal mark thus recorded is duplicated in the historical database 24b in the data management server 24 at time of the next duplication to the historical database, which is carried out regularly (212). The contents of the data retaining database 24a are regularly duplicated in the receiving database 33c in the internal server 33 and simultaneously cleared, for example, every ten minutes. Accordingly, when users usually initiate data withdrawal process, the data is not left in the data retaining database 24a.

When withdrawal process executed by the user is executed within ten minutes after new data writing process, a withdrawal mark is recorded while the data are recorded in the data retaining database 24a. Then, a regular duplication between the external server 21 and the internal server 33, is executed and the data are cleared from the data retaining database 24a. In the internal server 33, the withdrawn data are stored in the data storing database 33a. However, in-house users cannot see the data, because a withdrawal mark is attached to the record of the data in the historical database 33b. In other words, since a file of a record to which a withdrawal mark is attached in the historical database, is not displayed in the directory, in-house users cannot access the file.

Data Replacement Process

Figure 11:
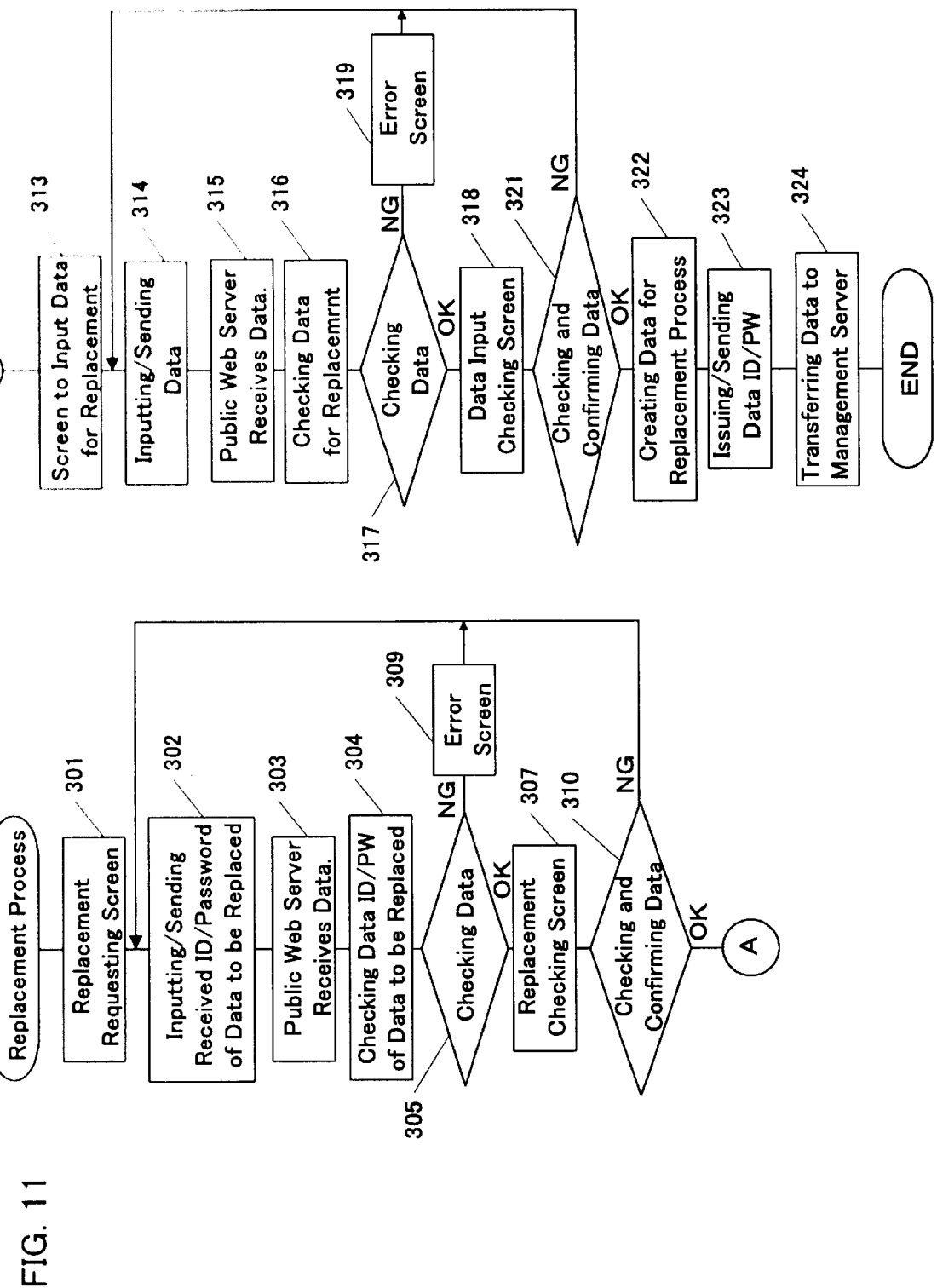
FIG. 11 is a flow chart showing a process of replacing data already sent, in one embodiment of the present invention.

With reference to FIG. 11, data replacement process is described. A user comes into a screen for requesting data replacement, from the menu screen in the Web site by a process similar to that of the data withdrawal process mentioned above (301). In this example, the data writing screen of FIG. 6 also functions as the screen for requesting data replacement. When the user clicks "change (replacement)" in a portion for selecting withdrawal, inputs the data ID and data password of the data to be replaced (about which the user has been informed by X through the receiving receipt) in the data ID field 82 and data password field 83 and clicks the send button (302), the replacement information is sent to the public Web server 22 (303).

The public Web server 22 checks agreement between the data ID and data password stored in the historical database 22b and the data ID and data password newly received (304), and further checks the data for a formal error (305) and, if an error is found, sends an error screen to the user to ask the user to input correct ones (309).

When an error is not found, the Web server 22 sends a screen for checking replacement to the user (307). The screen may be that provided with items shown in FIG. 6 and further with a "replacement confirm" button. When the user clicks a replacement confirm button (310), the information is sent to the public Web server. In response to this, the public Web server 22 sends to the user a screen to input new data for the replacement (313). The screen may be that similar to a screen shown in FIG. 6. In this case, the selecting portion 81, the data ID field and the data password field can be omitted.

When the user inputs data, attaches a file to be attached and clicks a send button (314), new data are sent to the public Web server 22 (315). The public Web server 22 checks format of the data for the replacement and, if an error is found, sends an error screen to the user (319) to ask the user to input correct ones.

When an error is not found in the data for the replacement, the public Web server 22 sends to the user a screen for checking data input (318). When the user clicks a confirm button (321), in response to this, the public Web server 22 creates data for the replacement process (322), issues a new data ID and a new data password for the user (323) and sends the new data and historical data to the data management server (324).

The replacement process at step 322 is described with reference to FIGS. 12 and 13. When the user makes the system execute an operation to replace data (data ID=HMXX0002) already supplied to X with new data, REPLACE(OLD) is recorded in a data condition field of the record of the data ID=HMXX0002, as shown in the column of DATA-2 in FIG. 12. Further, date and time when the replacement was carried out are recorded in a processing date field of a <replacement/withdrawal information area>, while date and time when sending was carried out to the data management server 24 are recorded in a sending date field of the <replacement/withdrawal information area>. Further, a data ID (HMXX0005) of the data newly added by the replacement is recorded in a data ID field of the data for the replacement.

Further, in the column DATA-3 for new data with which the data were replaced, REPLACE(NEW) is recorded in a data condition field in a <data condition area>. When sending to the data management server 24 is completed, SENT is recorded in an internal sending condition field. Then, a processing date, a sending date, a data ID, a data password and a user ID are recorded as new data in a <new data information area>. Further, a processing date of the replacement process, a user ID, a sending date and a data ID of the replaced data are recorded in a ,replacement/withdrawal information area>.

FIG. 13 is an example of a content display screen of the historical databases 22b and 24b. In a record of data ID=HMXX0002 for the replaced data, mark "" is recorded, while in a record of data ID=HMXX0005 for the data which has been added by the replacement, mark "+" is recorded. The system administrator can see the content display screen. Contents of the historical database 24b are duplicated in the historical database 33b of the internal server 33. However, a record with "" mark which has been replaced and a record with "X " mark which has been deleted are not displayed on display screens for in-house users of X.

System with a Shared Database

Figure 14:
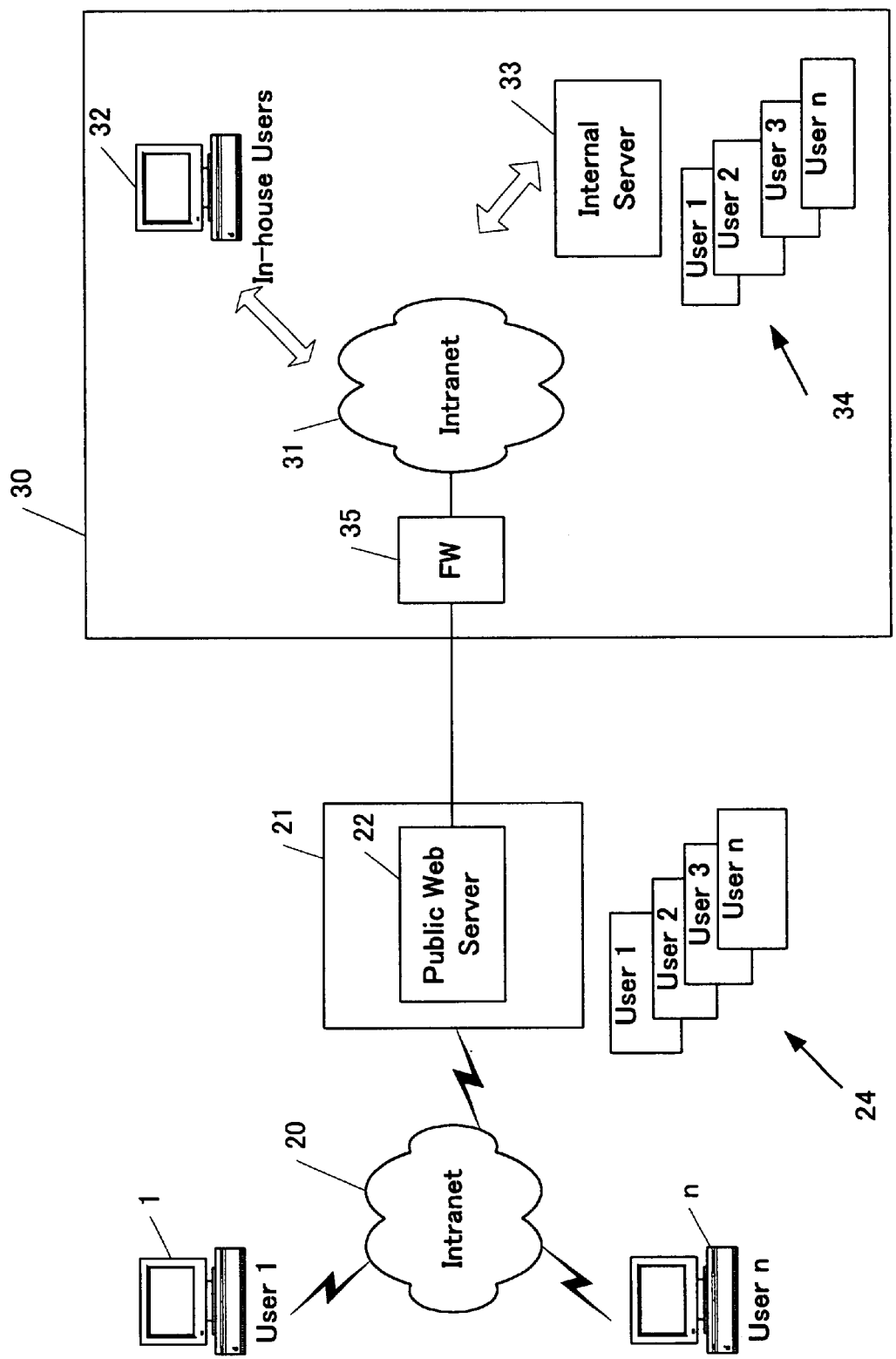
FIG. 14 is a diagram showing an overall configuration of a system of one embodiment according to the present invention.

FIG. 14 shows an overall configuration of one embodiment of the present invention. An in-house system 30 is provided with an internal server 33 connected to an in-house network 31 such as an intranet and many in-house users can access the internal server through personal computers 32. The system 30 is connected to a public Web server 22 in a server 21 installed outside the enterprise, via a firewall 35. In this embodiment, the external server and the internal server are connected by a private line.

Personal computers 1 to n of a plurality of users can access the public Web server 22 via the Internet to access the Website of the enterprise. A user can come into pages for business by inputting a user ID and a password at the Web site of the enterprise. In one embodiment, pages for business are designed specifically for each of users. In a database of the public Web server, boxes 24 specific to each of users are placed. For example, when a user access a Web site in the public Web server using a personal computer 1, writes data in forms, attaches a file to be attached and clicks a send button, the data and the attached file are stored in a box 24 specific to the user. The data and the attached file stored in the box 24 are transferred to the internal server in the enterprise via the firewall 35 and stored in corresponding one of boxes 34 specifically prepared for each of users.

Figure 15:
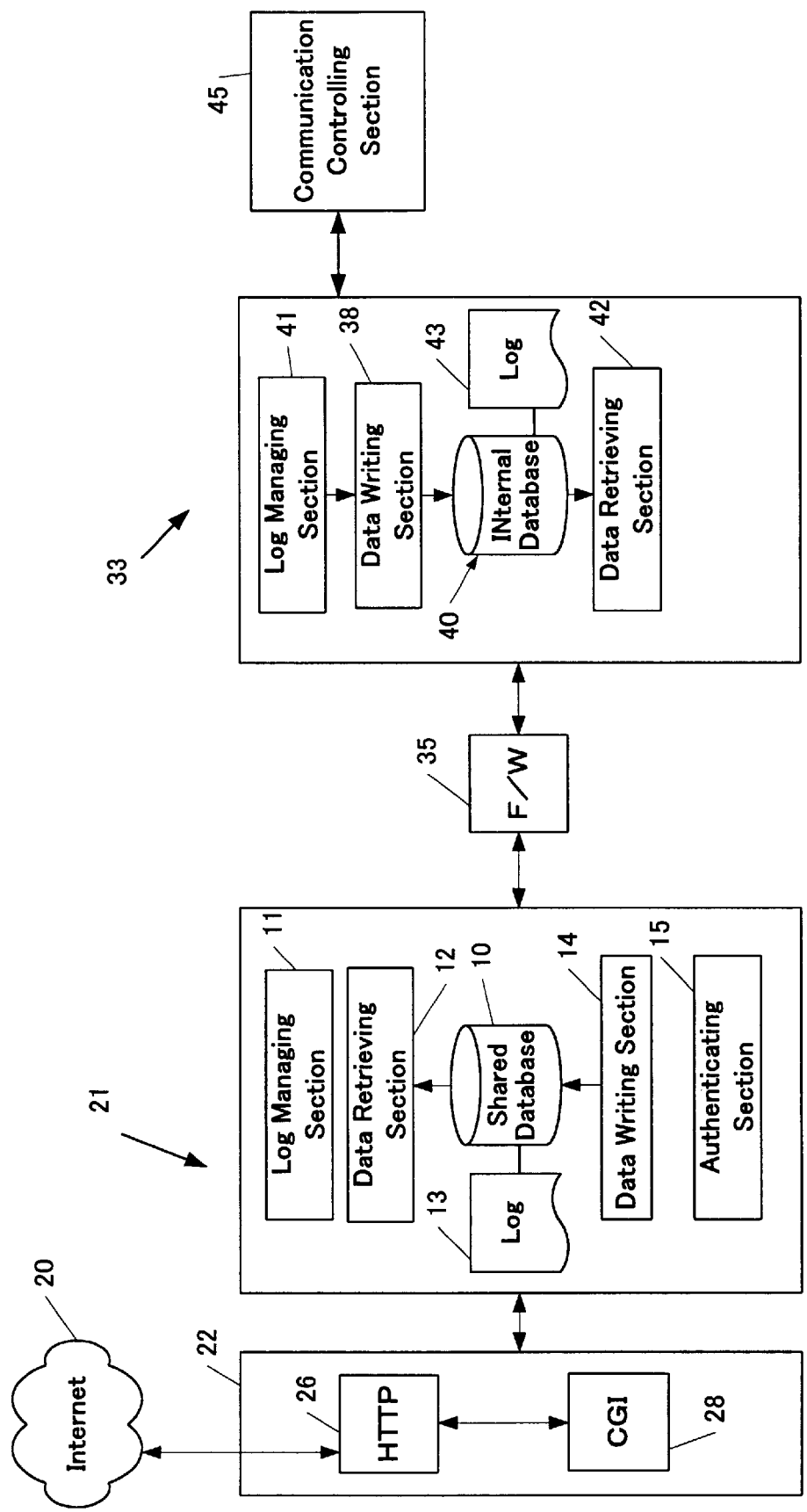
FIG. 15 is a block diagram showing, in more detail, a system of one embodiment according to the present invention.

FIG. 15 shows a more detailed configuration of the external server 21 and the internal system 30 according to one embodiment of the present invention. The Web server 22 installed with the external server 21, is provided with a HTTP protocol communicating section 26, so that communication between users and the public Web server 22 is carried out by HTTP protocol via the Internet 20. The communicating section 26 is ready for HTTP protocol carrying out an encrypted communication by SSL, and in one embodiment communication is carried out by HTTPS protocol after sending a user ID and a password. The Web site supplied in the public Web server 22, is managed by CGI (Common Gateway Interface) program 28.

The external server 21 is provided with a shred database 10 and a log file 13 for recording a log of accesses to the database. The shared database 10 is provided with boxes specific to each of users who utilize the electronic file management system, for business. The boxes are specifically storage areas allocated to each of user Ids, in the storage device.

A user activates a browser on the personal computer, input URL of the Web site of an enterprise or clicks a preset icon to have the top page of the Web site of the enterprise displayed in the browser. On the top page fields are provided to input a user ID and a user password. When the user ID previously issued by the enterprise and the password previously registered are input into the fields and a send button is clicked, the user ID and password are sent to the public Web server 22 and passed to an authenticating section 15 by the CGI program.

In response to a successful authentication of the user ID and the user password, the CGI program 28 form a business page corresponding to the user in the form of HTML document by dynamic menu forming technique to send it back to the user. Thus, the business page for the user is displayed in the browser of the user. The user can retrieve the electronic file in the shared database, which has been supplied by himself or herself and carry out any editing operation (data update, deletion or the like) thereon, by inputting a name of the electronic file in input fields of the business page. Further, a new file can be registered in the shared database by attaching a new file to a field for a file to be attached, on the business page.

In one embodiment, an electronic file ID is used, in place of a electronic file name to specify an electronic file in the shared database. The electronic file ID is given by the public Web server 22 when the user sends a new file to public Web server and the file is stored in the shared database 10. Then, in order to notify the user of the electronic file ID, it is sent to the user.

When the shared database is accessed by the user, a record of the access is made in the log file 13. The log file comprises a user ID field indicating the user who has accessed the database, a file ID field indicating an electronic file ID of the accessed electronic file, a file name field indicating a name of the accessed file, an operation field indicating a kind of operations (reading, writing, overwriting, deleting or the like), a size field indicating a size of the file and a date and time field indicating a date and time of the access. The above fields are shown in the table below.

TABLE 1

The fields of the log file

| User ID | File ID | File name | Operation | Size | Date and time |
| --- | --- | --- | --- | --- | --- |

One record is made for one operation. One operation means each one of writing, overwriting and deleting. Operations of reading and then correcting an electronic file for replacement are regarded as two operations, that is, reading and overwriting, and therefore two records are made.

Records in the log file 13 move, accompanying the related electronic file. In other words, when an electronic file is copied from the shared database 10 to an internal database 40 in the internal server 33, the log records relating to the electronic file are copied to a log file 43 in the internal server 33. On the other hand, when an electronic file is copied from the internal database 40 in the internal server 33 to the shared database 10 in the external server, the log records relating to the electronic file are copied from the log file 43 to the log file 13.

The internal server is provided with the internal database 40 and the log file 43 for making records of accesses to the internal database 40. The log file 43 has the same file configuration with that of the log file 13 in the external server 21. Insofar as electronic files related to users are concerned, the contents of the internal database 40 are kept so as to agree with those of the shared database 10 in the external server 21 as described in more detail below.

An in-house user 32 can retrieve an electronic file by accessing the internal database through the intranet 31 and can write an electronic file which he or she wish to supply to users, in the database 40. All the above operations are recorded in the log file 43. A data writing section 38 controls writing data in the internal database 40, while a data retrieving section 42 controls retrieving (reading) data from the internal database 40. A communication controlling section 45 controls communication between the internal server 33 and the external server 21. In the above example, communication between the internal server 33 and the external server 21 is carried out by Internet protocol (IP protocol).

A log managing section 11 in the external server 21 reads the log file 13 at certain intervals (for example, every fifteen minutes) and checks whether a new record has been generated for the preceding certain interval, that is, checks information on a change in the shared database 10. For the checking, a time field of the log file is searched. When a corresponding new log record is found, an operation field of the log record is checked. In one embodiment, when the content of the operation field is "reading", the log record is merely transferred to the internal server 33 and copied to the log file 43. Consequently, the in-house user can find out whether or not an electronic file which he or she has uploaded to the internal database for users' browsing, has been browsed by users after being copied to the shared database 10.

When the content of the operation field is "writing" or "overwriting", the electronic file related to the log record is read from the shared database 10, transferred to the internal database 33 and written or overwritten in the internal database. When the content of the operation field is "deleting", the log record is transferred to the internal server. In response to the transfer, the internal server logically deletes the corresponding electronic file in the internal database and the log record is copied to the log file 43. Thus, the contents of the internal database 40 and log file 43 are made to agree with those of the shared database 10 and log file 13.

Similarly, a log managing section 41 in the internal server 33 reads the log file 43 at certain intervals and detects whether an operation done by an in-house user, which has changed the contents of the electronic files for the preceding certain interval, that is, detects information on a change in the shared database 40. Concerning the above, in one embodiment, "reading" operation is not to be detected, because the log of the shared database 10 does not need to reflect it. When a log record subjected to "writing" or "overwriting" is found, the corresponding electronic file is read from the internal database 40, transferred with the log record to the external server 21 and written or overwritten in the shared database, while the log record is copied to the log file 13. In case of "deleting", the log record alone is transferred to the external server 21. In response to the transferred log record, the external server 21 deletes the corresponding electronic file in the shared database and copies the log record to the log file 13. Thus, the contents of the shared database are made to agree with those of the internal database 40.

The enterprise can enable users to browse information it wishes to transmit to them, by writing it in the internal database. The reason is that after a lapse of a certain time after the writing, the electronic file related to the information is transmitted by the log managing section 41, to the shared database 10 in the external server 21 and written therein. Thus, users can browse a file for a request for quotation, to which a specification for the quotation is attached.

Figure 16:
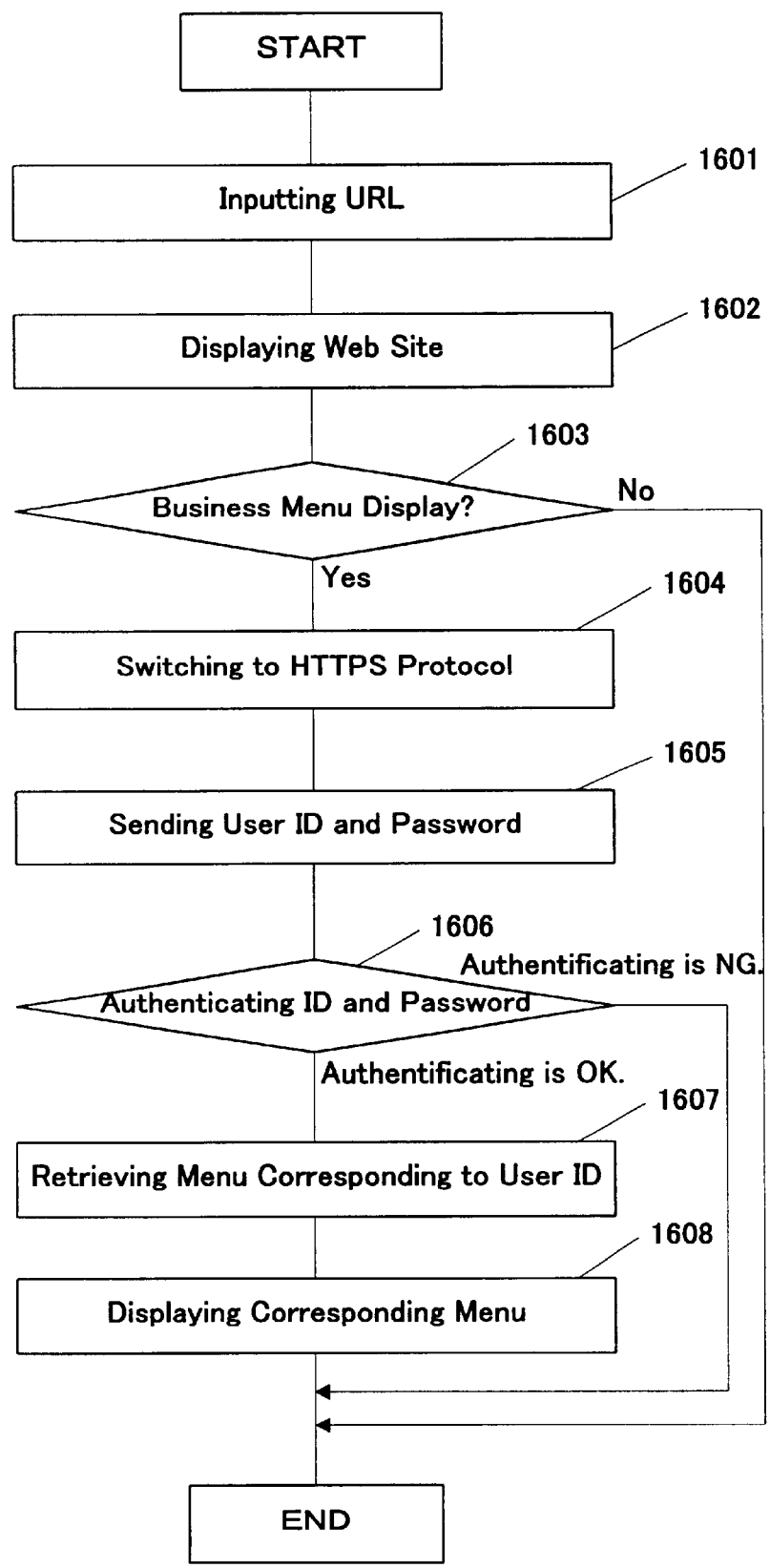
FIG. 16 is a flow chart showing a process in which a user has a menu page for business displayed in the browser in one embodiment according to the present invention.

FIG. 16 shows a process from accessing to the Web site to displaying of the business menu. When a member of a company in cooperation with X activates the browser on a personal computer 1 which is designed to have a dial-up connection with the Internet provider, inputs URL of X and presses an enter key (1601), the public Web browser 22 corresponding to the URL sends the HTTP document for the top page of the Web site of X in the browser 1. Thus, the top page of the Web site of X is displayed on the browser 1 (1602). The top page includes a "business menu button" hyperlinked to a "business menu" page besides a plurality of buttons hyperlinked to pages for company information, products information, distributors information or the like. Below the business menu button, fields are provided to input a user ID and a password.

When the user inputs the user ID and password and then clicks the "business menu button" (1603), the communication protocol is switched to HTTPS protocol carrying out encrypted communication using SSL (1604) and the user ID and password are sent to the public Web server 22 (1605). The public Web server 22 compares the received user ID and password with those previously registered for authentication (1606), if the authentication is successful, selects a menu according to the user and edits a menu page (1607) and sends the menu page in the form of HTML document to the browser 1. Thus, a business menu page corresponding to the user is displayed in the browser 1 (1608).

Figure 17:
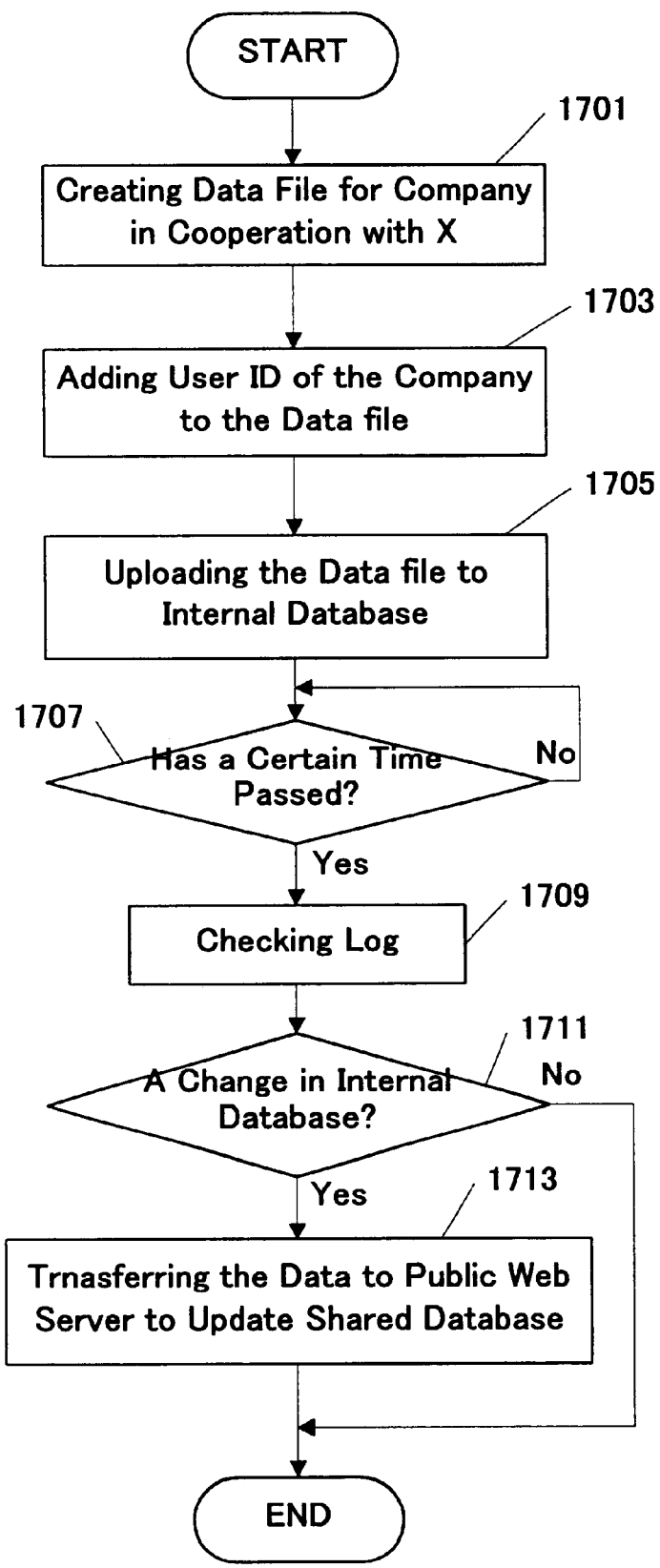
FIG. 17 is a flow chart showing steps in which a company Y in cooperation with X comes to be able to access a data file created by a responsible person of X.

FIG. 17 is a flow chart showing a flow of the process by which a responsible person of X sends a request for quotation to a company in cooperation with X. The responsible person creates a data file for the request for quotation to be sent to Y, on a personal computer in the purchasing department (1701). The user ID of Y is added to the data file (1703). The user ID can be obtained by searching a partner management table.

The responsible person uploads the data file to the internal database 40 of the internal server 33 (1705). At this time, a record of writing the data file in the database 40 is made in the log file 43.

At step 1707, the log managing section 41 determines whether a certain time (for example, fifteen minutes) has lapsed after the preceding log checking. When the certain time has lapsed, the log managing section 41 reads the log file 43 and determines whether for the certain time, in-house users have done any of operations of writing, overwriting and deleting in the internal database 40 (1709, 1711). In the above case, the responsible person has written the new data file in the internal database. Accordingly, the internal server 33 reads the data file and the log record related to it respectively from the internal database 40 and the log file 43 and sends them to the external server 21 under control of the communication controlling device 45 (1713).

In response to the sending, the external server 21 writes the data file and the log record related to it respectively in the shared database 10 and the log file 13. The data file is put into the box specific to Y in the shared database 10. Thus, Y can access the data file for the request for quotation, created by the responsible person of X.

In the above embodiment, it is not necessary to allocate a physically fixed storage area to the box specific to Y, as far as the box is designed in such a way that it cannot be accessed without using the user ID and user password of Y.

In the above, the present invention was described based on the specific embodiments. However, the present should not be limited to the above-mentioned embodiments and many types of variations which those skilled in the art can easily implement also fall within the scope of the presents invention.

According to the present invention, a secured as well as convenient system for information exchanging between enterprises using the Internet is obtained.

What is claimed is:

1. An electronic file management system comprising an external server installed in the outside and an internal server communicating with the external server wherein said external server comprises a public Web server which a browser can access via the Internet and a Web data management server which is connected to said public Web server via a firewall and said public Web server contains a Web site of an enterprise associated with the internal server, so that data which a browser accessing the Web site interactively sends to the public Web server, are sent to said Web data management server via said firewall, wherein said public Web server is provided with a Web site of an enterprise, which includes a special-purpose page which users having a user ID and a user password issued by the enterprise, alone can browse, so that data supplied by the users are sent to said public Web server using said special-purpose page and wherein if said external server receives said data normally, said external server issues a data ID unique to the file of the data, stores the data ID in a historical database and informs the user who has supplied the data, of the data ID.

2. An electronic file management system according to claim 1, wherein in response to sending of said data ID and a mark indicating withdrawal or replacement, from said special-purpose page or pages associated with said special-purpose page, said external server executes withdrawal or replacement process of the file of the data ID.

3. An electronic file management system according to claim 2, wherein at first said internal server temporally stores the data from the external server in a receiving database, and then transfers the data to a data storing database after a certain time has lapsed or after a certain amount of data have been stored in the receiving database.

4. An electronic file management system according to claim 3, wherein said internal server is provided with a historical database and the data stored in the historical database of said external server is transferred to the historical database of the internal server to be stored.

5. An electronic file management system according to claim 1, wherein said external server issues a data password associated with the data ID, together with said data ID, stores the data password in the historical database and informs the user who has supplied said data, of the data password.

6. A method for communication between an internal server of an enterprise and an external server installed in the outside of the enterprise, wherein said external server comprises a public Web server which a browser can access via the Internet and a Web data management server which is connected to said public server via a first firewall and said public Web server contains a Web site of the enterprise associated with the internal server and said external server is connected to said internal server via a second firewall, and wherein the Web site of the enterprise includes a special-purpose page which users having a user ID and a user password issued by the enterprise, alone can browse, so that data supplied by the users are sent to said public Web server using said special-purpose page, the method comprising the steps of:

storing data which a browser accessing the Web site interactively sends to said public Web server, in said public Web server, issuing a data ID unique to the file of the data if said external server receives said data normally, storing the data ID in a historical database, informing the user who has supplied the data, of the data ID, sending said data stored in said public Web server, to said Web data management server via said first firewall, storing said data stored in said Web data server, and sending said data stored in said Web data management server management server to said internal server via said second firewall.

7. A method according to claim 6, further comprising the step of deleting said data stored in the public Web server after having transferred said data received from the browser, to said Web data management server.

8. A method according to claim 6, further comprising the step of deleting said data received from the browser, stored in the Web data management server after having transferred said data received from the browser, to said internal server.

9. A method according to claim 6, wherein in response to sending of said data ID and a mark indicating withdrawal or replacement, from said special-purpose page or pages associated with said special-purpose page, said external server executes withdrawal or replacement process of the file of the data ID.

10. A method according to claim 9, wherein at first said internal server temporally stores the data from the server in a receiving database, and then transfers the data to a data storing database after a certain time has lapsed or after a certain amount of data have been stored in the receiving database.

11. A method according to claim 10, wherein said internal server is provided with a historical database and the data stored in the historical database of said external server is transferred to the historical database of the internal server to be stored.

12. A method according to claim 6, wherein said external server issues a data password associated with the data ID, together with said data ID, stores the data password in the historical database and informs the user who has supplied said data, of the data password.

* * * * *

UNITED STATES PATENT AND TRADEMARK OFFICE
CERTIFICATE OF CORRECTION

PATENT NO. : 6,651,061 B2
DATED : November 18, 2003
INVENTOR(S) : Jiyunji Uchida and Yoshinobu Hara It is certified that error appears in the above-identified patent and that said Letters Patent is hereby corrected as shown below:

<u>Title page,</u>
Item [54], Title, after the words "ELECTRONIC FILE MANAGEMENT SYSTEM", please insert -- AND METHOD --.
Item [75], Inventors, please delete "Unchida" and insert -- Uchida --.

<u>Column 17,</u>
Line 17, after the word "data", please insert -- management --
Line 19, after the word "server" delete "management server"

<u>Column 18,</u>
Line 11, after the words "stores data from the", please insert -- external --

Signed and Sealed this

Sixth Day of April, 2004

JON W. DUDAS
*Acting Director of the United States Patent and Trademark Office*